June 19, 1956 J. HALLER 2,751,293
PROCESS OF MAKING PERFORATED POWDERED METAL ARTICLE
Filed July 31, 1951 2 Sheets-Sheet 2

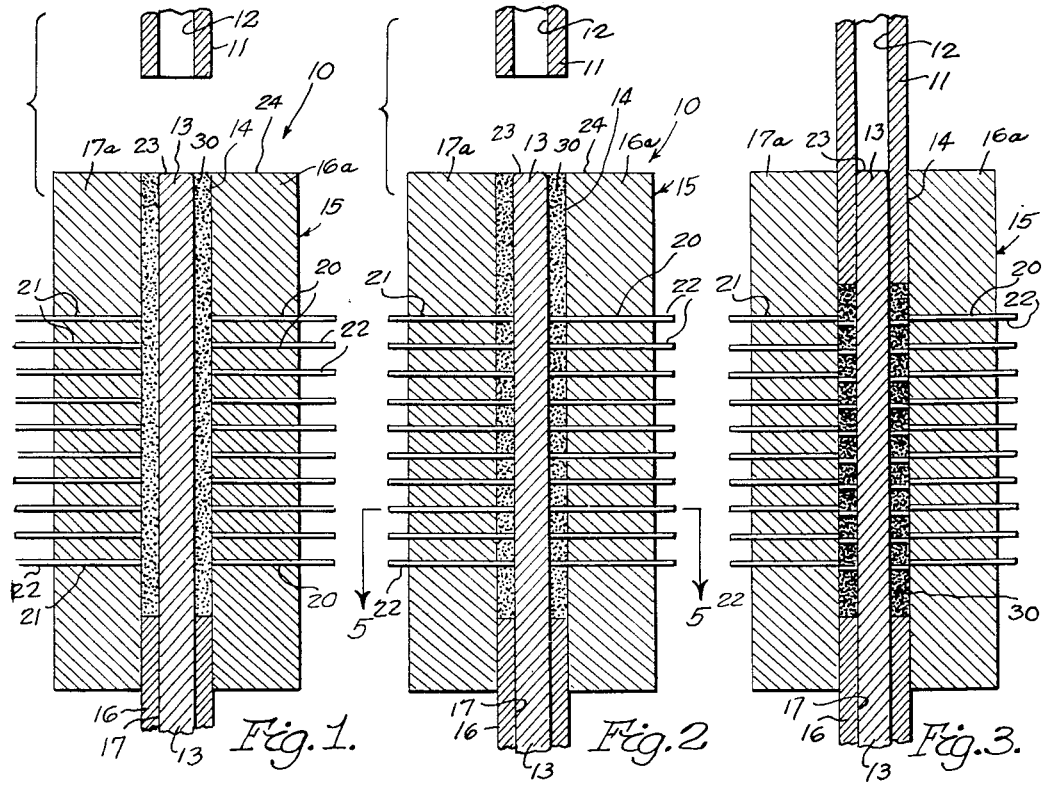
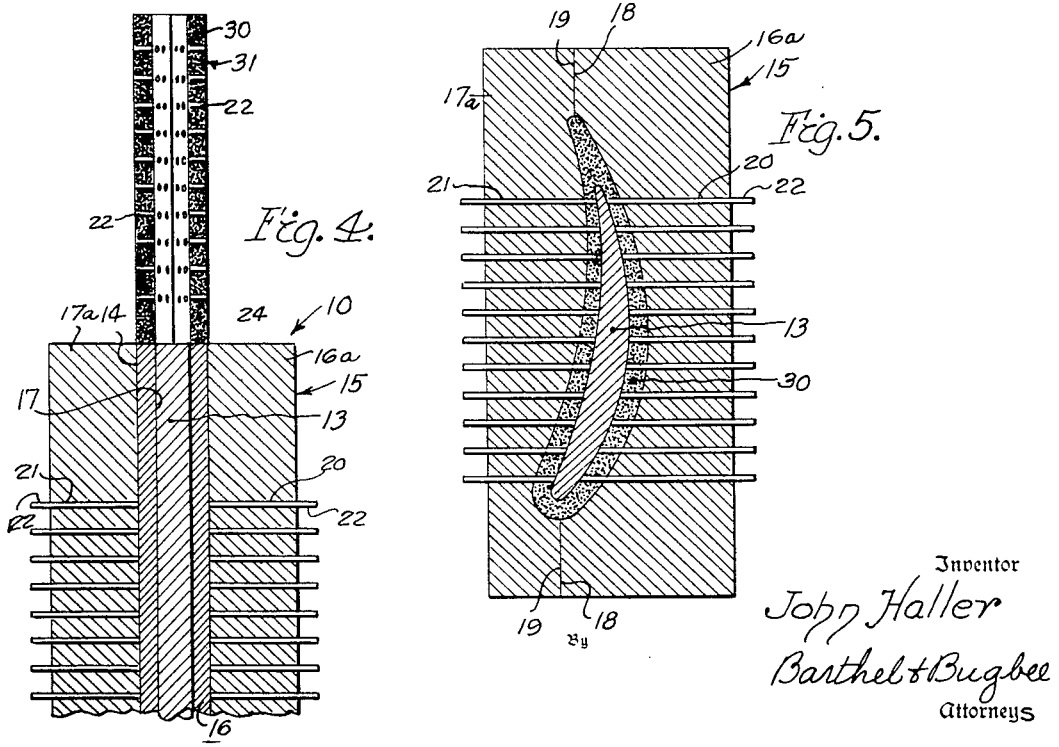

Inventor
John Haller
Barthel & Bugbee
Attorneys

United States Patent Office 2,751,293
Patented June 19, 1956

2,751,293

PROCESS OF MAKING PERFORATED POWDERED METAL ARTICLE

John Haller, Northville, Mich., assignor, by mesne assignments, to Allied Products Corporation, Detroit, Mich., a corporation of Michigan Application July 31, 1951, Serial No. 239,569

5 Claims. (Cl. 75—214)

This invention relates to powder metallurgy and, in particular, to processes of making perforated powdered metal articles.

One object of this invention is to provide a process of making a perforated powdered metal article, such as a turbine blade with ventilating holes, wherein the article is provided with a central cavity or passageway intersected by a multiplicity of transverse holes, the latter being formed by embedded wires or rods of infiltratable material in the unsintered powdered metal article, after which the rods are cut off after compressing the powdered metal in the die, and the article subjected to sintering during which the wires, which are of infiltratable metal or metal alloy, melt and infiltrate into the pores of the article, leaving multiple holes where the wires had previously been located.

Another object is to provide a process of making a perforated powdered metal article according to the foregoing object, wherein a core rod is employed to form a passageway or cavity in the unsintered article which, after sintering, results in a cavity intersected by multiple perforations where the infiltratable wires had previously been located.

Another object is to provide a process of making a perforated powdered metal article, according to the first object above, wherein a core of infiltratable metal or metal alloy is also embedded in the powdered metal article and the wires caused to abut the core before compressing, after which the sintering operation causes both the wires and the core to melt and infiltrate into the pores of the powdered metal article, strengthening the article as well as leaving multiple holes leading through the walls of the article into the cavity of passageway left where the core had previously been located.

Another object is to provide a process of making a perforated powdered metal article wherein the cavity in the article is provided with a spongy porous heat-exchanging structure formed by inserting a mixture of partly infiltratable and partly non-infiltratable articles in the cavity of a previously prepared and sintered perforated article, resintering this assembly to infiltrate the infiltratable particles and leave the spongy central structure.

Another object is to provide a process of making a perforated powdered metal article, such as a turbine blade, wherein the perforations may be graduated as to their number, separation and distribution in order to vary the amount of ventilation or other effect produced by the perforations in different portions of the article.

Other objects and advantages will become apparent during the course of the following description of the accompanying drawings, wherein:

Figure 1 is a central vertical section through a molding die of a powdered metal molding press, according to one form of the invention, showing the parts in their relative locations immediately after the die cavity has been filled with powdered metal;

Figure 2 is a view similar to Figure 1, but showing the parts in their relative positions after the perforation wires have been pressed laterally into contact with the core;

Figure 3 is a view similar to Figures 1 and 2, but showing the parts in their relative positions at the end of the compression stroke of the upper press plunger, sheering off the wires and compressing the powdered metal charge in the die cavity;

Figure 4 is a view similar to Figures 1, 2 and 3, but showing the parts in their relative positions after the upper press plunger has been retracted and the lower press plunger advanced upward to eject the molded but as yet unsintered article;

Figure 5 is a horizontal cross-section taken along the line 5—5 in Figure 2;

Figure 6:
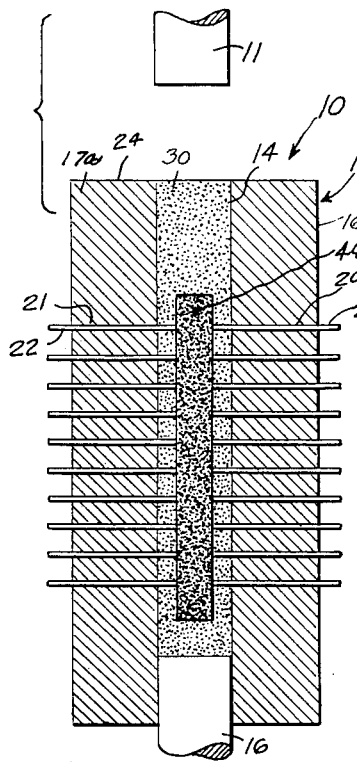
Figure 6 is a central vertical section through a molding die showing a modified procedure in a process step corresponding to Figure 2 but employing an infiltratable core to make an end-closed cavity, instead of a core rod to make an open cavity.
Figure 7:
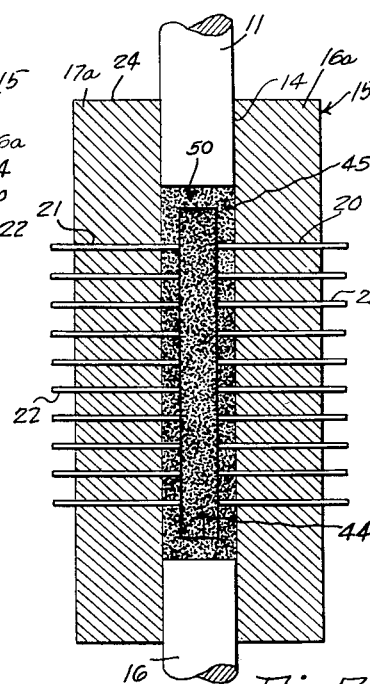
Figure 7 is a view similar to Figure 6 but showing the positions of the parts at the end of the compression stroke.

Hitherto, it has been very difficult to make articles of powdered metal having multiple perforations therein, particularly where the perforations are required to intersect a passageway. Such an article is a turbo-jet engine blade which requires such holes and passageways in order to cool the blade by letting the gases pass through it during operation, thereby increasing the length of the life of the blade. The present invention provides a process of making an article, such as a turbine blade, so constructed. The process consists in inserting wires of infiltratable metal or metal alloy into the metal powder in the die cavity, compressing the powder, sheering or otherwise cutting off the wires and ejecting the compressed article from the mold and sintering the article to infiltrate the wires into the powdered metal, leaving multiple perforations where the wires had previously been located. By this process it is also possible to produce graduated perforations, or a greater number of perforations per square inch in one part of the article than in other parts thereof. The invention also provides a process of making the central cavity either by use of a core rod in the molding press or, in a modification (Figures 6 to 9 inc.) by using an infiltratable core which melts and disappears by infiltration into the pores of the metal during the sintering operation. A further modification of the process of the invention provides a coarse honeycomb or spongy structure in the central cavity, increasing the heat exchanging properties of the article.

Referring to the drawings in detail, Figures 1 to 5 inclusive show diagrammatically a molding press, generally designated 10, having an upper molding plunger 11 with a cavity 12 shaped to receive a core rod 13, and shaped to enter the die cavity 14 of a molding die 15. The die cavity 14 at its lower end receives a lower molding plunger 16 having a central bore 17 of substantially the same cross-sectional outline as the core rod 13 and adapted to slidably receive the latter. The upper and lower molding plungers 11 and 16 and core rod 13 are reciprocated by the mechanism of a conventional press, which in itself is outside the scope of the present invention.

The die 15 is mounted in the bed or on the die table of such a press. The die 15, for convenience, may be made in two opposing halves 16a and 17a abutting one another along the faces 18 and 19 respectively (Figure 5). In order to produce the multiple perforations desired in the article, the die halves 16a and 17a are provided with multiple holes 20 and 21 adapted to receive wires 22 of infiltratable metal, as described below in connection with the operation of the invention. The wires 22 for use with powdered metal particles of iron or steel may be formed of copper or copper-zinc alloy of any desired ratio, such as, for example, 85% copper and 15% zinc.

Figures 11, 12:
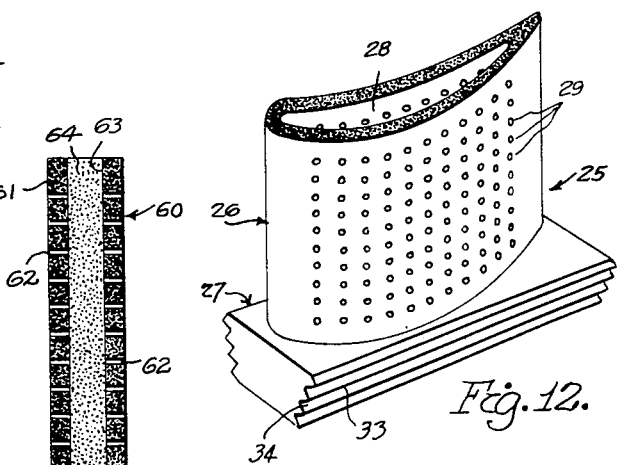
Figure 11 is a vertical section through the further modified article shown in Figure 10, after resintering to produce a spongy porous structure in the cavity.
Figure 12 is a perspective view, partly cut away, of a ventilated turbine blade made by the processes of the present invention.

In practising the process of the invention, to produce the perforated article such as the turbine blade, generally designated 25 (Figure 12), having a blade portion 26 welded to a hub or brace 27 of so-called "Christmas tree" shape and provided with a central cavity or passageway 28 intersected by multiple perforations or holes 29, the operator inserts the multiple wires 22 in the holes 20, 21 of the die halves 16a, 17a of the die 15, causing them to terminate at the walls of the die cavity 14 (Figure 1). With the lower molding plunger 16 at its desired position in the die cavity 14 and the core rod 13, which is of the desired cross-sectional shape for the central passageway, located with its upper end 23 flush with the top surface 24 of the die 15 (Figure 1), the operator fills the die cavity 14 around the core rod 13 with metal powder of the kind desired for the blade portion 26 of the perforated article or turbine blade 25 (Figure 12). Such powdered metal may, for example, consist of powdered iron, or, for greater strength, powdered steel.

With the die cavity 14 thus filled around the core rod 13 (Figure 2), the wires 22 are pushed inward, pushing aside the particles of powdered metal 30 until their inner ends engage and abut the core rod 13 (Figures 2 and 5). The upper molding plunger 11 is now caused to descend upon its compression stroke (Figure 3), entering the die cavity 14, with its cavity 12 receiving the correspondingly shaped core rod 13, compressing the metal particles 30. If the compression is of sufficiently great ratio, this action sheers off the wires 22 at their intersection with the die cavity 14. If not, then the wires 22 are sheered off when, immediately thereafter, the upper molding plunger 11 is retracted (Figure 4), and the lower molding plunger 16 advanced to eject the unsintered article generally designated 31, containing the embedded infiltratable wires 22.

The unsintered article 31 containing the embedded infiltratable wires 22 is now transferred to a sintering oven and sintered at the temperature and for the time suitable for the particular article. For a powdered iron article of a relatively small size, a sintering time of one-half hour at 2020° F., has been found satisfactory. During the sintering operation, the wires 22 melt and the molten metal wholly or partly infiltrates the pores of the article, strengthening the article and leaving holes 29 (Figure 12) where the wires had previously been located. In order to complete the article, if it is the turbine blade 25 (Figure 12), the blade portion 26 is welded or otherwise suitably secured to the base 27, the latter preferably being of elongated Christmas-tree shape having longitudinal side ridges and grooves 33 and 34 respectively. These are inserted in the usual grooved recesses in the hub of the turbine motor (not shown) and secured in a manner known to those skilled in this art and lying outside the scope of the present invention.

In the use of the turbine blade 25, as the turbine rotor is rotated, the gases sweeping past it pass through the multiple holes 29 and out through the passageways 28, cooling the blades so that they do not burn up or wear away, as they rapidly do with solid blades.

To produce the modified article, generally designated 40 (Figure 9) with a central enclosed cavity 41 and multiple ventilation or cooling holes 42 in the side walls 43 thereof, a press 10 and die 15 similar to that shown in Figures 1 to 5 inclusive, except that the core rod 13 is omitted and the upper and lower plungers 11 and 16 are accordingly solid, is employed. The wires 22 to be inserted in the holes 20 and 21 of the die halves 16a and 17a respectively are also prepared, together with a core 44 of metal or metal alloy which, as described above, is infiltratable into the metal particles 30. For powdered iron particles 30, the core 44 may therefore consist of 85% copper and 15% zinc.

The die cavity 14 is now filled up to the point where it is desired that the bottom of the core 44 is to rest, after which the core 44 is placed thereupon. The wires 22 are now preferably pushed inward through their holes 20, 21 until they engage the opposite sides of the core 44, holding the latter in position while the remainder of the die cavity 14 is filled with the powdered metal particles 30.

Figures 8, 9:
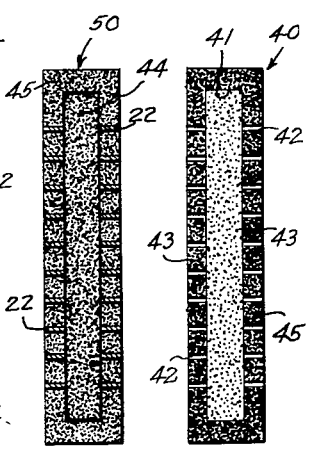
Figure 8 is a central vertical section through the powdered metal article shown in Figure 7 after the wires have been sheered off and the article ejected from the die cavity, but before sintering.
Figure 9 is a view similar to Figure 8, but showing the appearance of the parts after sintering has taken place and the wires and core have melted and infiltrated into the pores of the article, strengthening the article and leaving multiple holes intersecting a central cavity.
Figure 10:
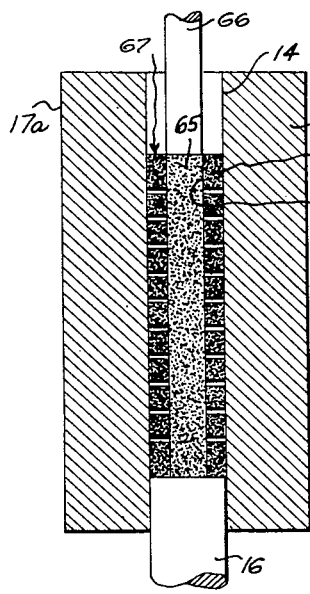
Figure 10 is a view showing a further modification of the article and process wherein a composite core of particles, part of which are infiltratable and part non-infiltratable, is inserted in a previously sintered perforated article prepared according to Figures 1 to 5 inclusive; prior to sintering.

The upper molding plunger 11 is now moved downward into the die cavity 14 of the die 15 (Figure 7), compressing the charge of metal particles 30 around the wires 22 to form a body 45. If the compression ratio is great enough, the wires 22 may be sheered off at their junction with the bore 23 in a manner analogous to that shown in Figure 3, or they may be subsequently sheered off when, in the next step of the operation, the upper molding plunger 11 is retracted upward and the lower molding plunger 16 advanced upward to eject the unsintered molded article 50 from the mold cavity 14, this article 50 containing the embedded wires 22 and the enclosed infiltratable core 44 (Figure 8).

The article 50 is now transferred to a sintering oven and sintered at a suitable time and temperature which, as previously stated, may for a small article comprise heating the article for a half hour at 2020° F. During the sintering operation, both the wires 22 and the core 44 melt and infiltrate into the pores of the sintered metal body 45, densifying and strengthening the body 45 and leaving the sintered hollow article 40 with its body 43 penetrated by holes 42 leading into the cavity 41 (Figure 9). The article 40, such as the blade portion of a turbine blade assembly, may be united to a base similar to the base 27 (Figure 12) in the manner previously described in connection with Figures 1 to 5 inclusive. The operation of the modified article 40 is similar to that of the turbine blade 25, and requires no repetition. The article 40 differs from the turbine blade portion 26 in that the former has an enclosed cavity 41 and the latter an open cavity 28.

Upon experimentation, it has been found that an improved heat dissipating effect and cooling action is obtained if the cavity or recess 28 in the center of the blade portion 26 is filled with coarse particles forming a honeycomb or sponge-like structure. To form the article 60 (Figure 11) having a body 61 containing multiple transverse holes 62 leading into a cavity 63 containing a metal honeycomb structure 64, the body 61 with its holes 62 and cavity 63 are formed, as before, in the manner shown and described in connection with Figures 1 to 5 inclusive and sintered to cause the wires 22 to infiltrate into the body 61.

Meanwhile a core 65 has been prepared by mixing together and shaking particles of infiltratable metal or metal alloy with particles of a non-infiltratable metal or metal alloy, and suitably compressing the same. The body 61 is then replaced in the die cavity 14 of the die 15, after which the core 65 is inserted in the central cavity 63 by means of a plunger 66. This assembly, generally designated 67, is then placed in a sintering furnace and resintered, whereupon the infiltratable metal particles in the core 65 melt and infiltrate the body 61, densifying and strengthening the latter and leaving a honeycomb or coarse porous structure 64 in the cavity 63.

The article 60, if the blade portion of a turbine, is then secured as by welding to a base portion such as the base portion 27 (Figure 12) and mounted in a turbine rotor in the manner described above. In the operation of the turbine rotor, the gases in the engine pass through the holes 29 and through the pores of the honeycomb structure 64, which serves as a heat exchanger to receive and dissipate the heat from the body 61.

What I claim is:

1. A process of making a perforated powdered metal article, comprising placing a charge of powdered metal in a cavity configured to the desired shape for said article, embedding in said powdered metal charge a multiplicity of perforation forms disposed in spaced relationship to one another in a predetermined pattern, each form being configured to the desired shape of the perforation and composed of metal infiltratable into the powdered metal of said charge, compressing said charge with the forms embedded therein sufficiently to sheer off said forms at the edges of said cavity and to produce a powdered metal body, and sintering said body to melt said forms and infiltrate the metal thereof into the pores of said body.

2. A process of making a hollow perforated powdered metal article, comprising placing a core configured to produce said hollow in a cavity configured to the desired shape for said article, placing a charge of powdered metal in said cavity around said core, embedding in said powdered metal charge a multiplicity of perforation forms disposed in spaced relationship to one another in a predetermined pattern, each form being configured to the desired shape of the perforation and composed of metal infiltratable into the powdered metal of said charge, compressing said charge with the forms embedded therein sufficiently to sheer off said forms at the edges of said cavity and to produce a powdered metal body, and sintering said body to melt said forms and infiltrate the metal thereof into the pores of said body.

3. A process of making a hollow perforated powdered metal article, comprising placing a core configured to produce said hollow in a cavity configured to the desired shape for said article, placing a charge of powdered metal in said cavity around said core, embedding in said powdered metal charge a multiplicity of perforation forms disposed in spaced relationship to one another in a predetermined pattern with the inner ends of said forms contacting said core, each form being configured to the desired shape of the perforation and composed of metal infiltratable into the powdered metal of said charge, compressing said charge with the forms embedded therein sufficiently to sheer off said forms at the edges of said cavity and to produce a powdered metal body, and sintering said body to melt said forms and infiltrate the metal thereof into the pores of said body.

4. A process of making a hollow perforated powdered metal article, comprising placing a core configured to produce said hollow in a cavity configured to the desired shape for said article, placing a charge of powdered metal in said cavity around said core, embedding in said powdered metal charge a multiplicity of perforation forms disposed in spaced relationship to one another in a predetermined pattern, each form being configured to the desired shape of the perforation and composed of metal infiltratable into the powdered metal of said charge, compressing said charge with the forms embedded therein to produce a powdered metal body, sintering said body to melt said forms and infiltrate the metal thereof into the pores of said body, filling the hollow in said sintered body cavity with a mixture of metal particles infiltratable into the metal of said body and metal particles uninfiltratable therein, and resintering said sintered body and particle mixture therein to infiltrate the infiltratable particles into said body and leave a honeycomb structure in said hollow.

5. A process of making a hollow perforated powdered metal article, comprising placing a core configured to produce said hollow in a cavity configured to the desired shape for said article, placing a charge of powdered metal in said cavity around said core, embedding in said powdered metal charge a multiplicity of perforation forms disposed in spaced relationship to one another in a predetermined pattern, each form being configured to the desired shape of the perforation and composed of metal infiltratable into the powdered metal of said charge, compressing said charge with the forms embedded therein to produce a powdered metal body, sintering said body to melt said forms and infiltrate the metal thereof into the pores of said body, reinserting said sintered body in a mold cavity of corresponding shape, filling the hollow in said sintered body cavity with a mixture of metal particles infiltratable into the metal of said body and metal particles uninfiltratable therein, compressing said mixture while in said hollow, and resintering said sintered body and particle mixture therein to infiltrate the infiltratable particles into said body and leave a honeycomb structure in said hollow.

References Cited in the file of this patent

UNITED STATES PATENTS

| Number | Name | Date |
| --- | --- | --- |
| 1,855,855 | Gillis et al. | Apr. 26, 1932 |
| 2,201,225 | Cadwallader | May 21, 1940 |
| 2,298,885 | Hull | Oct. 13, 1942 |
| 2,373,405 | Lowit | Apr. 10, 1945 |
| 2,431,660 | Gaudenzi | Nov. 25, 1947 |
| 2,464,517 | Kurtz | Mar. 15, 1949 |
| 2,520,373 | Price | Aug. 29, 1950 |

FOREIGN PATENTS

| Number | Country | Date |
| --- | --- | --- |
| 611,466 | Great Britain | Oct. 29, 1948 |
| 268,223 | Switzerland | May 15, 1950 |